(12) United States Patent
Huang et al.

(10) Patent No.: US 10,533,874 B2
(45) Date of Patent: Jan. 14, 2020

(54) INERTIAL POSITIONING AND NAVIGATION DEVICE FEATURING A NOVEL WALK DETECTION METHOD

(71) Applicants: Institute of Nuclear Energy Research Atomic Energy Council, Executive Yuan, Taoyuan (TW); National Yunlin University of Science & Technology, Yunlin (TW)

(72) Inventors: Chung-Hao Huang, Taoyuan (TW); Lun-Hui Lee, Taoyuan (TW); Chian-Cheng Ho, Taipei (TW); Zu-Hao Lai, New Taipei (TW)

(73) Assignees: INSTITUTE OF NUCLEAR ENERGY RESEARCH ATOMIC ENERGY COUNCIL, EXECUTIVE YUAN, Taoyuan (TW); NATIONAL YUNLIN UNIVERSITY OF SCIENCE & TECHNOLOGY, Yunlin (TW)

( * ) Notice: Subject to any disclaimer, the term of this patent is extended or adjusted under 35 U.S.C. 154(b) by 714 days.

(21) Appl. No.: 15/256,864

(22) Filed: Sep. 6, 2016

(65) Prior Publication Data
US 2017/0115131 A1 Apr. 27, 2017

(30) Foreign Application Priority Data

Oct. 26, 2015 (TW) .............................. 104135037 A

(51) Int. Cl.
*G01C 22/00* (2006.01)
*H04W 4/12* (2009.01)

(52) U.S. Cl.
CPC ............ *G01C 22/006* (2013.01); *H04W 4/12* (2013.01)

(58) Field of Classification Search
CPC ...... G01C 22/006; G01C 21/12; G01C 21/20; G01C 21/30; G01C 21/16; G01C 21/165; (Continued)

(56) References Cited

U.S. PATENT DOCUMENTS 6,574,554 B1 * 6/2003 Beesley ................. G01C 21/30
340/990
8,751,194 B2 * 6/2014 Panther ............... G06F 3/04883
702/160

(Continued)

FOREIGN PATENT DOCUMENTS

CN 104757976 A 7/2015

OTHER PUBLICATIONS

Schuler "Measuring Rotational Motion with Linear Accelerometers". (Year: 1967).*

(Continued)

*Primary Examiner* — Regis J Betsch
*Assistant Examiner* — Kaleria Knox
(74) *Attorney, Agent, or Firm* — Birch, Stewart, Kolasch & Birch, LLP

(57) ABSTRACT

A walk detection method for detecting a motion state of a user includes: measuring a number of triaxial components of gravitational acceleration vector of the device; calculating a triaxial angular velocity of the device; recording data inputs of the triaxial angular velocity, and recording the data inputs not larger than a filtered threshold as effective data inputs; calculating a mean of effective data inputs; calculating a difference value between the effective data inputs and a mean thereof; and determining that, when the difference value is smaller than a threshold of walking state, the user is in a walking state. Otherwise, the user is determined to be in a shaking state at the same location.

11 Claims, 9 Drawing Sheets

(58) Field of Classification Search
CPC .......... H04W 4/12; A63F 13/40; A61B 5/024; A61B 5/0002; A61B 5/112; A61B 5/1038; A41D 1/002; G01F 3/04883; G01P 21/00
See application file for complete search history.

(56) References Cited

U.S. PATENT DOCUMENTS

| | | | | |
|---|---|---|---|---|
| 9,810,549 | B2* | 11/2017 | Johnson | G01C 25/005 |
| 2002/0143491 | A1* | 10/2002 | Scherzinger | G01C 21/16 |
| | | | | 702/160 |
| 2004/0033808 | A1* | 2/2004 | Rorabaugh | G01S 5/0289 |
| | | | | 455/456.1 |
| 2008/0016961 | A1* | 1/2008 | Dwyer | A61B 5/0002 |
| | | | | 73/504.02 |
| 2011/0208444 | A1* | 8/2011 | Solinsky | A61B 5/112 |
| | | | | 702/41 |
| 2012/0136573 | A1* | 5/2012 | Janardhanan | G01C 21/165 |
| | | | | 701/512 |
| 2012/0253234 | A1* | 10/2012 | Yang | A61B 5/1038 |
| | | | | 600/595 |
| 2014/0052010 | A1* | 2/2014 | Kasama | A61B 5/024 |
| | | | | 600/508 |
| 2014/0229135 | A1* | 8/2014 | Nomura | G01P 21/00 |
| | | | | 702/94 |
| 2015/0190713 | A1* | 7/2015 | Goetgeluk | A63F 13/40 |
| | | | | 345/156 |
| 2016/0165965 | A1* | 6/2016 | Ellis | A41D 1/002 |
| | | | | 434/81 |

OTHER PUBLICATIONS

TW Search report for corresponding TW application No. 104135037 dated Aug. 23, 2016 (2 pages).

* cited by examiner

|    | 1 | 2 | 3 | 4 | 5 | 6 | 7 | 8 | 9 | 10 |
|----|---|---|---|---|---|---|---|---|---|----|
| 1  | 0 | 3 | ∞ | 4 | ∞ | ∞ | 4 | ∞ | ∞ | 5  |
| 2  | 3 | 0 | 6 | ∞ | ∞ | 6 | ∞ | ∞ | ∞ | 3  |
| 3  | ∞ | 6 | 0 | 1 | 6 | 4 | ∞ | ∞ | ∞ | ∞  |
| 4  | 4 | ∞ | 1 | 0 | 8 | ∞ | 5 | 3 | ∞ | ∞  |
| 5  | ∞ | ∞ | 6 | 8 | 0 | ∞ | ∞ | ∞ | ∞ | ∞  |
| 6  | ∞ | 6 | 4 | ∞ | ∞ | 0 | ∞ | ∞ | ∞ | ∞  |
| 7  | 4 | ∞ | ∞ | 5 | ∞ | ∞ | 0 | 7 | ∞ | ∞  |
| 8  | ∞ | ∞ | ∞ | 3 | ∞ | ∞ | 7 | 0 | 3 | ∞  |
| 9  | ∞ | ∞ | ∞ | ∞ | ∞ | ∞ | ∞ | 3 | 0 | ∞  |
| 10 | 5 | 3 | ∞ | ∞ | ∞ | ∞ | ∞ | ∞ | ∞ | 0  |

| 1 | 2 | 4 | 7 | 10 |   |
|---|---|---|---|----|---|
| 2 | 1 | 3 | 6 | 10 |   |
| 3 | 2 | 4 | 5 | 6  |   |
| 4 | 1 | 3 | 5 | 7  | 8 |
| 5 | 3 | 4 |   |    |   |
| 6 | 2 | 3 |   |    |   |
| 7 | 1 | 4 | 8 |    |   |
| 8 | 4 | 7 | 9 |    |   |
| 9 | 8 |   |   |    |   |
| 10| 1 | 2 |   |    |   |

FIG.9

INERTIAL POSITIONING AND NAVIGATION DEVICE FEATURING A NOVEL WALK DETECTION METHOD

CROSS-REFERENCE TO RELATED APPLICATION

This application claims priority of Taiwanese Application No. 104135037, filed on Oct. 26, 2015.

FIELD

The disclosure relates to an inertial positioning and navigation device, more particularly to an inertial positioning and navigation device which applies a novel walk detection method.

BACKGROUND

As portable or wearable devices become more and more popular and advanced, it is common for portable devices to be equipped with a high-performance processor, diverse sensors, and ubiquitous networking so as to offer functionalities of positioning and navigation. As a result, a number of navigation applications on the portable device have been developed.

In order to obtain the location of the portable device, a number of outdoor and indoor positioning methods may be utilized. For example, a global positioning system (GPS) unit may be employed for outdoor positioning. For indoor positioning, the portable device may be configured to detect pre-deployed indoor positioning infrastructure, like QR code or wireless sensor network (WSN), to obtain a relative indoor location. But, these multilateration-based outdoor and indoor positioning methods above always suffer from electromagnetic interference and infrastructure cost. Based on the principle of dead reckoning, the inertial positioning device using an inertial measurement unit (IMU) to determine the displacement of the user relative to an initial position is a better alternative. More importantly, it never suffers from electromagnetic interference and infrastructure cost.

However, some inevitable faults in the inertial positioning device need to be solved at first, for example, the error rate of the walk detection and the error-accumulation nature of the inertial positioning device. Especially, when the portable device is rotated or shaken by the user staying at the same location, the inertial positioning device tends to misdetect the walk state of the user and misestimate the distance of the displacement.

SUMMARY

Therefore, the purpose of the disclosure is to propose a novel walk detection method that improves the potential accuracy issue of inertial positioning device as described above.

According to one embodiment of the disclosure, the walk detection method is to detect the motion state of the user. The walk detection method is to be developed by a device equipped with an inertial measurement unit (IMU) that is worn on the user, and a displacement processing unit coupled to the IMU. The walk detection method includes the steps of:

a) measuring, by the IMU 110, the triaxial components of gravitational acceleration vector of the device worn on the user;

b) calculating, by the displacement processing unit 120, the triaxial angular velocity of the device via the triaxial components of gravitational acceleration vector detected in step a) and kinematics;

c) recording, by the displacement processing unit 120, the data of the triaxial angular velocity that varies under a filtered threshold as effective ones;

d) calculating, by the displacement processing unit 120, the mean of the effective data of the triaxial angular velocity recorded in step c);

e) comparing, by the displacement processing unit 120, the difference between the effective data of the triaxial angular velocity and their mean with a threshold of walking state; and f) determining, by the displacement processing unit 120, the motion state of the user by step e). If the difference is smaller than the threshold of walking state, the user is under walking state. Otherwise, the user is under shaking state at the same location.

Another purpose of the disclosure is to provide a positioning device of displacement measurement unit based on the inertial positioning technique that is capable of performing the aforementioned walk detection method. The displacement measurement unit 100 consisting of the inertial measurement unit (IMU) 110 and the displacement processing unit 120 is to generate the displacement vector.

The IMU 110 is configured to measure the triaxial components of gravitational acceleration vector of the device and to generate the inertial signal.

The displacement processing unit is to receive the inertial signal and thereby generate the displacement vector.

Furthermore, one more purpose of the disclosure is to propose a navigation device based on the inertial positioning technique that is capable of performing the aforementioned walk detection method. The navigation device is composed of a displacement measurement unit 100 and a navigation unit 200.

The displacement measurement unit 100 is composed of the inertial measurement unit (IMU) 110 and the displacement processing unit 120. The IMU 110 is configured to measure the triaxial components of gravitational acceleration vector of the device and to generate the inertial signal. The displacement processing unit is to receive the inertial signal and perform the displacement processing to generate the displacement vector.

The navigation unit 200 is to receive the displacement vector and map the user's location onto the map data 300, and finally to generate a navigation signal of path directions.

The advantage of the disclosure is to detect the walk state of the user accurately by a novel walk detection method, to map the user's location onto the map data accurately, and to navigate the directions of the user accurately without any positioning infrastructure.

BRIEF DESCRIPTION OF THE DRAWINGS

Other features and advantages of the disclosure will become apparent in the following detailed description of the embodiments with reference to the accompanying drawings, of which:

FIG. 9 is a schematic diagram illustrating an example of a dynamic adjacency list representation of a map, according to one embodiment of the disclosure.

DETAILED DESCRIPTION

Figure 1:
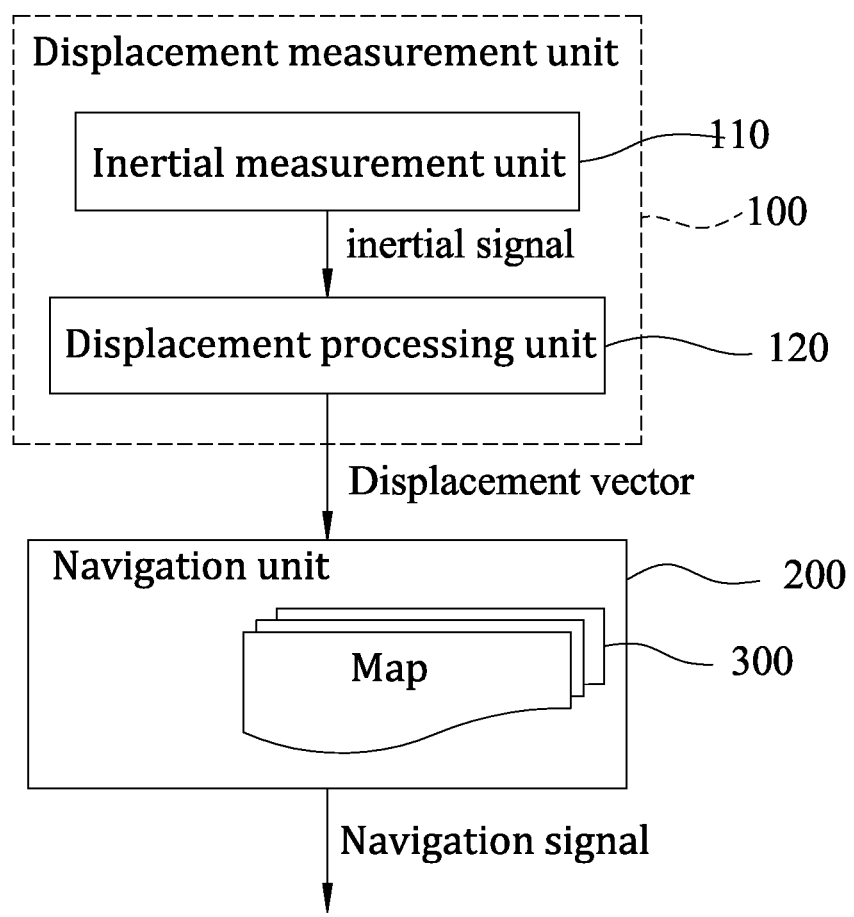
FIG. 1 is a block diagram illustrating a navigation device based on the inertial positioning technique that is capable of performing a novel walk detection method, according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a navigation device based on the inertial positioning technique that is capable of performing a novel walk detection method, according to one embodiment of the disclosure. In this embodiment, the term "user" may indicate a human subject, or any other creature.

The navigation device includes a displacement measurement unit 100 and a navigation unit 200 coupled to the displacement measurement unit 100. The navigation unit 200 stores a map 300 therein.

The displacement measurement unit 100 includes an inertial measurement unit (IMU) 110 and a displacement processing unit 120 coupled to the IMU 110. The IMU 110 may be embodied using a triaxial accelerometer, and may be incorporated with other components such as an e-compass, a gyroscope, etc. In use, the device composed of the IMU 110 may be provided to the user, so as to be worn on the user.

The IMU 110 is configured to measure a number of triaxial components of gravitational acceleration of the navigation device in a three-dimensional coordinate system, and to generate an inertial signal.

The displacement processing unit 120 may be embodied using a micro controller unit (MCU), a micro processor unit (MPU), etc. The displacement processing unit 120 receives the inertial signal from the IMU 110, and is programmed to perform a displacement computation to generate a displacement vector of the user in the three-dimensional coordinate system.

Specifically, the displacement vector of the user is generated based on a motion state of the user, a moving direction calculated using the acceleration of the user in the three-dimensional coordinate system, and a moving distance of the user.

Specifically, the motion state of the user is critical to determine the displacement vector of the user because when the user is in a minimal moving state, such as a shaking state at a same location (i.e., the user may be shaking or having other slight movements but has no actual displacement), the displacement measurement unit 120 may still detect acceleration, and subsequently generate a displacement vector, as if the user is in a walking state (i.e., is actually walking). Conventional walk detection methods, like peak detection, zero crossing, pattern matching, etc., may not effectively distinguish if the user is in the walking state or in the shaking state at the same location. Therefore, a novel walk detection is proposed in this disclosure to detect the motion state of the user.

Figure 2:
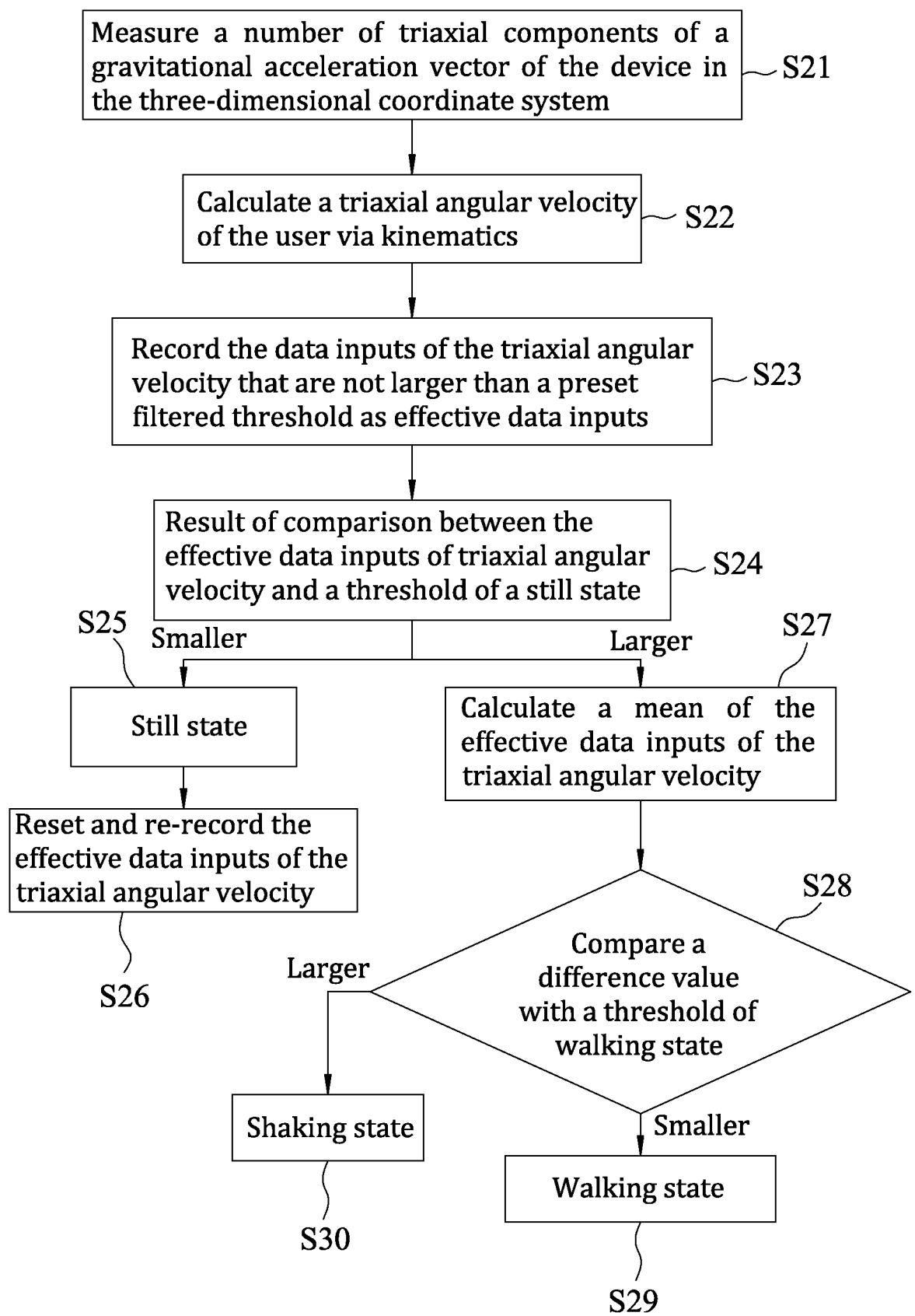
FIG. 2 is a flow chart illustrating a novel walk detection method to detect a walk state of a user, according to one embodiment of the disclosure.

Referring to FIG. 2, in this embodiment, a walk detection method executed by the displacement measurement unit 100 to determine the motion state of the user is employed.

In step S21, the IMU 110 measures acceleration of the user. Specifically, the IMU 110 measures a number of triaxial components of gravitational acceleration vector of the navigation device in the three-dimensional coordinate system, and generates an inertial signal.

In step S22, in response to the triaxial components of gravitational acceleration of the navigation device in the three-dimensional coordinate system (in the form of the inertial signal) from the IMU 110, the displacement processing unit 120 calculates the triaxial angular velocity of the device via kinematics. It is noted that in time, as the IMU 110 continues to measure the triaxial components of gravitational acceleration vector of the device, a plurality of data inputs of the triaxial angular velocity may be calculated.

In step S23, the displacement processing unit 120 records the data inputs of the triaxial angular velocity which are not larger than a preset filtered threshold as effective data inputs. In this embodiment, the preset filtered threshold is 5 degrees/millisecond.

In step S24, the displacement processing unit 120 compares the effective data inputs of triaxial angular velocity with a threshold of still state. In this embodiment, the preset threshold of still state is 1 degree/millisecond.

When it is determined by the displacement processing unit 120 that the effective data inputs of triaxial angular velocity are smaller than the threshold of still state, in step S25, the displacement processing unit 120 determines that the user is in the still state and the flow proceeds to step S26. In step S26, the displacement processing unit 120 resets and re-records the effective data inputs of the triaxial angular velocity.

Otherwise, when it is determined by the displacement processing unit 120 that the effective data inputs of triaxial angular velocity are larger than the threshold of still state, the flow proceeds to step S27 and calculates a mean of the effective data inputs of the triaxial angular velocity, and calculates a difference value associated with a difference between the effective data inputs of the triaxial angular velocity and the mean of the effective data inputs of the triaxial angular velocity.

Then, in step S28, the displacement processing unit 120 compares the difference value with a threshold of walking state. In this embodiment, the preset threshold of walking state is 30 degrees/millisecond.

When it is determined by the displacement processing unit 120 that the difference value is smaller than the threshold of walking state, the flow proceeds to step S29 and determines the user is in the walking state. Otherwise, the flow proceeds to step S30 and determines the user is in the shaking state at the same location.

In particular, in steps S21 and S22, the term "kinematics" indicates the triaxial equations of kinematics, in terms of the triaxial components of gravitational acceleration vector and the triaxial angular velocity when the user is walking in the three-dimensional coordinate system. Specifically, the triaxial angular velocity of the navigation device worn on the user can be derived by triaxial components of gravitational acceleration vector and kinematics. It is noted that in cases where one of the three axes of the IMU 110 is parallel to the gravitational axis, the gravitational acceleration vector does not have a component on the other two axes, and therefore the rotating angular velocity cannot be obtained using the triaxial accelerometer alone. In such cases, an e-compass sensor may be employed to measure an included angle defined by the IMU 110 and a direction of the Earth magnetic field for obtaining the rotating angular velocity.

In step S23, some abrupt noise received by the IMU 110, resulted from external electromagnetic interference or electrical surge, must be filtered out. That is to say, only the data inputs that change not too sharply (i.e., under the preset filtered threshold) can be recorded as effective data inputs.

In step S24, the aforementioned effective data inputs of triaxial angular velocity is compared with the threshold of still state to determine whether the user is in still state. The threshold of still state is introduced such that slight noises detected by the IMU 110 are not interpreted as non-still state.

In step S26, the aforementioned effective data inputs of triaxial angular velocity must be reset and re-recorded after the user is determined to be in the still state. Because the previous effective data of triaxial angular velocity is outdated after the user is determined to be in the still state.

In steps S27 and S28, the difference value is compared with a threshold of walking state to determine whether the triaxial angular velocity of the device diverges from the previous trend. If the difference between the effective data of the triaxial angular velocity and their mean is larger than the threshold of walking state, the user is in the shaking state at the same location. Otherwise, the user is in the walking state. Only after the motion state of the user is determined, the calculation of the displacement vector can be performed with more accuracy.

In brief, the above described steps of the walk detection method for determining the motion state of the user may be executed with less time and resources as compared to the prior art, and is eligible to enable the calculation of the displacement vector.

Figure 3:
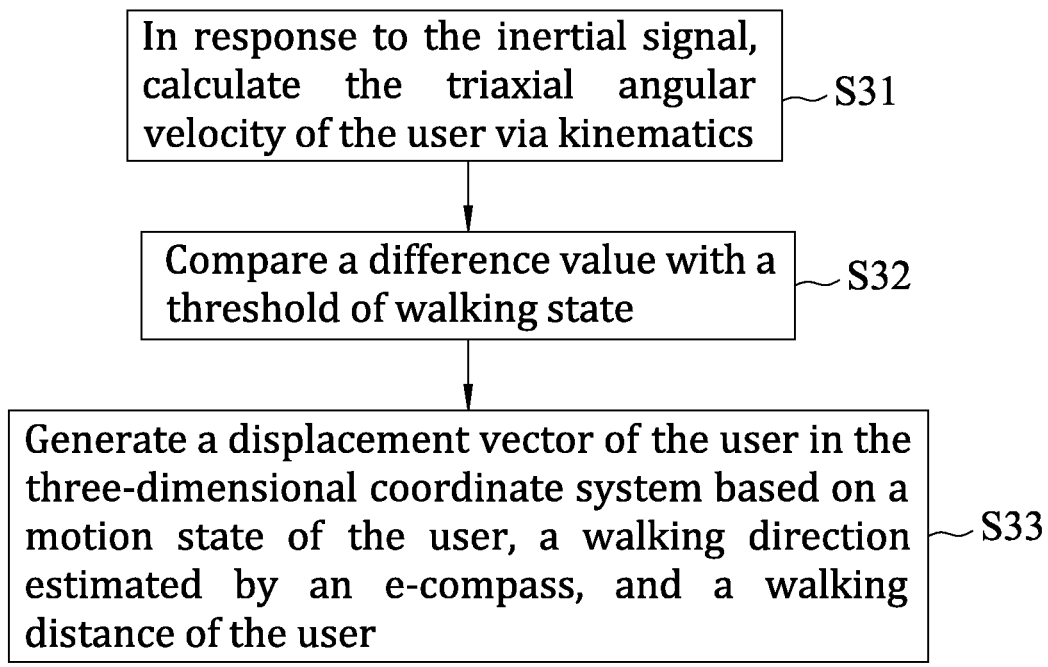
FIG. 3 is a flow chart illustrating a displacement processing method to generate a displacement vector of the user in a three-dimensional coordinate system, according to one embodiment of the disclosure.

FIG. 3 illustrates one embodiment of a displacement processing method to determine the motion state of the user, and to generate a displacement vector of the user in a three-dimensional coordinate system.

In step S31, in response to the triaxial components of gravitational acceleration vector of the navigation device from the IMU 110, the displacement processing unit 120 calculates the triaxial angular velocity of the user via kinematics.

In step S32, the displacement processing unit 120 determines the motion state of the user. The operations of steps S31 and S32 are similar to those as described in the previous paragraphs and illustrated in FIG. 2, and will not be repeated herein.

In step S33, the displacement processing unit 120 generates a displacement vector of the user in the three-dimensional coordinate system based on the motion state of the user, a walking direction estimated by e-compass, and a walking distance of the user.

Figure 4:
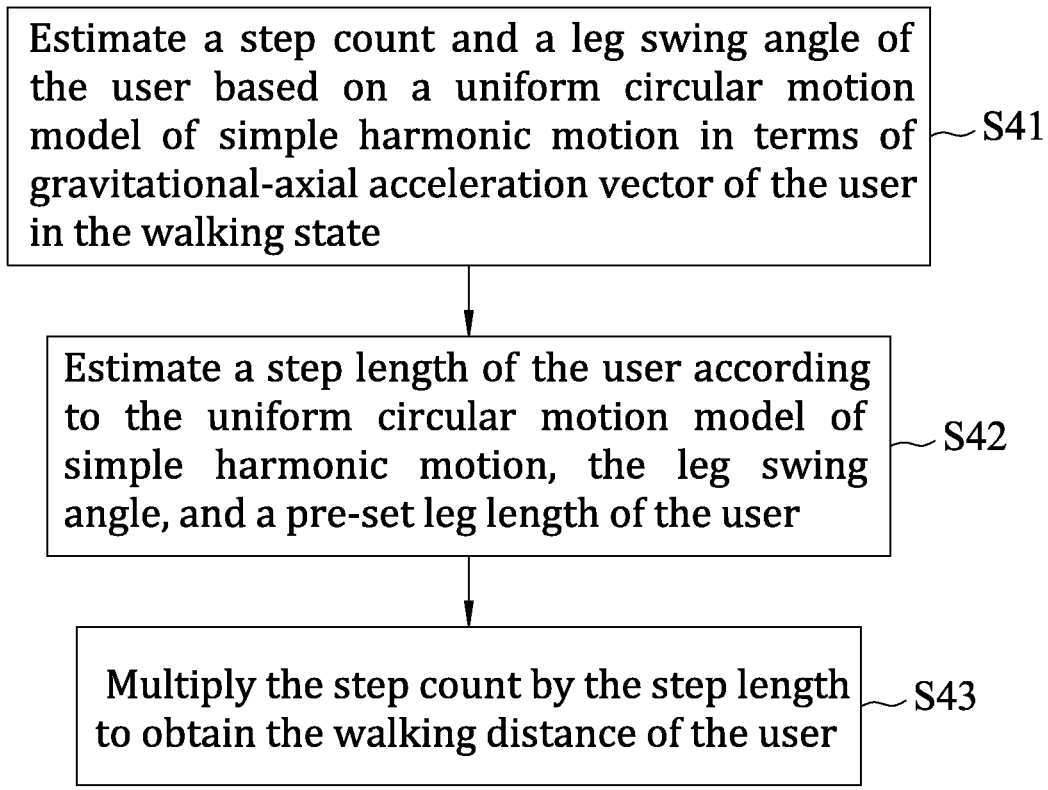
FIG. 4 is a flow chart illustrating steps for obtaining a step length and a walking distance of the user, according to one embodiment of the disclosure.

The walking distance of the user is specifically described by the following steps, as shown in FIG. 4.

In step S41, the displacement processing unit 120 estimates a step count and a leg swing angle of the user. Specifically, the estimation is done based on a uniform circular motion model of simple harmonic motion in terms of gravitational-axial acceleration vector of the user in the walking state. It is noted that, the term "leg swing angle" indicates an included angle between two legs of the subject.

In step S42, the displacement processing unit 120 estimates a step length of the user according to the uniform circular motion model of simple harmonic motion, the leg swing angle from step S41, and a preset leg length of the user.

In step S43, the displacement processing unit 120 multiplies the step count from step S41 by the step length from step S42 to obtain the walking distance of the user.

In particular, for the operations in step S41, the uniform circular motion model of simple harmonic motion in terms of gravitational-axial acceleration vector of the user in the walking state is employed. The following trigonometric equation may be used to obtain gravitational-axial acceleration vector by accumulating gravitational-axial components of triaxial acceleration vectors from the IMU 110:

$$X_g + Y_g + Z_g = X*\cos(\alpha) + Y*\cos(\beta) + Z*\cos(\gamma)$$

where X, Y, and Z represent the triaxial acceleration vectors, respectively, and $X_g$, $Y_g$, and $Z_g$ represent the gravitational-axial components of triaxial acceleration vectors, respectively. $\alpha$, $\beta$, and $\gamma$ represent the included angle between gravitational axis and triaxial acceleration vectors, respectively.

In this embodiment, an alternative equation may be used to simplify the above equation. In particular, the alternative equation is as follows.

$$X_g + Y_g + Z_g = X*\frac{90-\alpha}{90} + Y*\frac{90-\beta}{90} + Z*\frac{90-\gamma}{90}$$

Experimental result shows that the calculation of the alternative equation may be done with more efficiency and a reasonable error. Similar estimations may be done to obtain the estimation of the gravitational-axial components of triaxial acceleration vectors of the device.

After the gravitational-axial components of triaxial acceleration vectors of the device is calculated, the displacement processing unit 120 is programmed to count a number of the periodic variations (e.g., count a number of peak values), and to estimate the step count.

Figure 5:
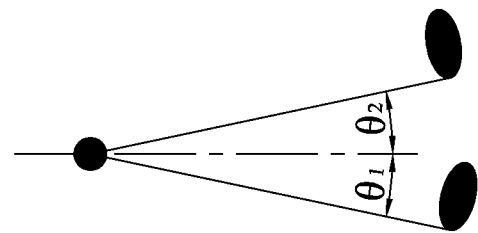
FIG. 5 illustrates variation of an included angle between two legs of the user, which is utilized for determining a step length of the user, according to one embodiment of the disclosure.
Figure 5:
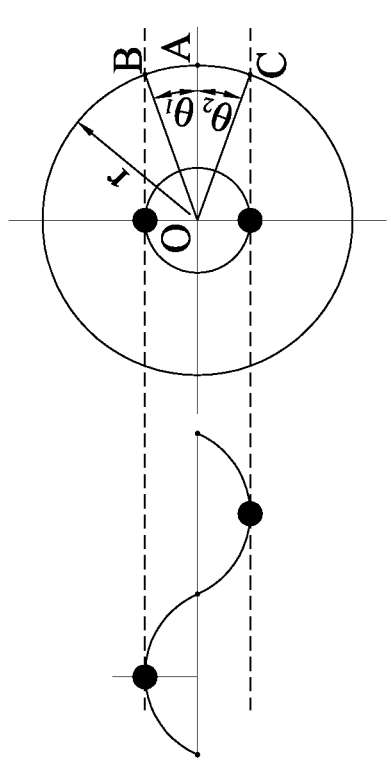

Specifically, as illustrated in FIG. 5, the variation of the leg swing angle of the user is equivalent to the variation of a fan angle of uniform circular motion model of simple harmonic motion in terms of gravitational-axial acceleration vector of the user under walking state. In particular, when the user is standing still (i.e., both of the legs are close to each other, and are stationary at the same location), the gravitational-axial acceleration vector of the user is rightly equal to the gravity. When the user is walking, the motion may be decomposed into two different actions. Firstly, one leg of the user swings from the back toward the other leg. During this action, the body of the user moves upwardly, and the gravitational-axial acceleration vector of the user increases. Secondly, the one leg of the user swings forwardly past the other leg. During this action, the body of the user moves downwardly, and the gravitational-axial acceleration vector of the user decreases. The waveform of the gravitational-axial acceleration vector of the user during one step may be expressed as a sinusoid.

The following estimation may be employed to obtain two legs' swing angle of the user. Firstly, the above sinusoid of the gravitational-axial acceleration vector may be mapped onto uniform circular motion model of simple harmonic motion. The radius of uniform circular motion model equals gravity, the value of the gravitational-axial acceleration vector of the user when the user is standing still is mapped onto point A on the uniform circular motion model, while the peak and the valley of the sinusoid are mapped onto points B and C on the uniform circular motion model, respectively. Then, two angles ∠AOB=$\theta_1$ and ∠AOC=$\theta_2$ can be determined. Specifically, $\theta_1$ represents the included angle between the one leg in the back before swinging toward the other leg and the imaginary axis perpendicular to the ground, and $\theta_2$ represents the included angle between the one leg after swinging forwardly past the front leg and the imaginary axis perpendicular to the ground.

In such a manner, the included angle may be obtained using the difference of gravitational-axial acceleration vectors in points A, B and C. In addition, the step count may be obtained by counting the period number of adjacent peaks and valleys in the sinusoid of the gravitational-axial acceleration vector.

Operations of steps S42 and S43 may be done using trigonometric measurements. It is noted that in an alternative embodiment, the step length of the user may be calculated separately for each step, and the step lengths of each step are added up to obtain the walking distance of the user. As such, the displacement vector can be calculated with higher accuracy and efficiency (through the estimations, complicated calculations are eliminated).

After the displacement vector is generated, the navigation unit 200 is operable to map the current location of the user onto the map 300 at a corresponding coordinate set. Specifically, the current location is obtained based on the displacement vector of the user. Additionally, the navigation unit 200 is operable to output a navigation signal that indicates route directions from the current location of the user to a preset destination. The preset destination may be a location designated by the user.

Figure 6:
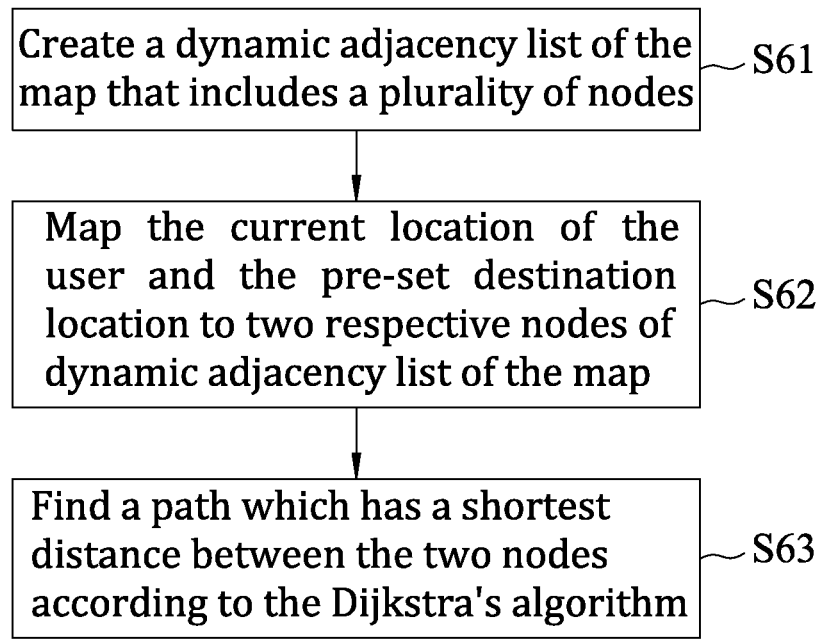
FIG. 6 is a block diagram illustrating steps for finding a shortest or fastest path between a current location of the user and a preset destination, according to one embodiment of the disclosure.

FIG. 6 illustrates steps of a flowchart for generating the route directions to be included in the navigation signal.

In step S61, the navigation unit 200 creates a dynamic adjacency list representation of the map 300 that includes a plurality of nodes.

In step S62, the navigation unit 200 maps the current location of the user and the preset destination location to two respective nodes of dynamic adjacency list of the map.

In step S63, the navigation unit 200 finds a path which has a shortest distance between the two nodes, or is fastest to cross, according to the Dijkstra's algorithm.

Figure 7:
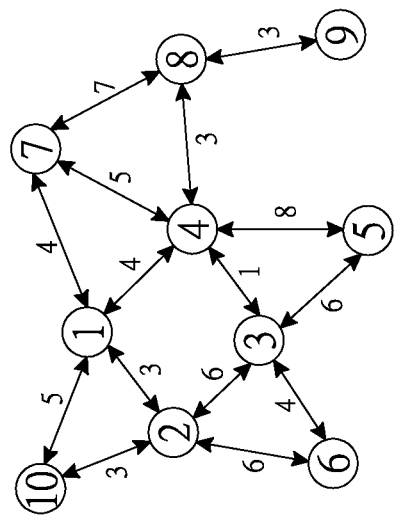
FIG. 7 is a schematic diagram illustrating an example of an adjacency matrix representation of a map according to one embodiment of the disclosure.

In particular, path searching is performed based on connected nodes in the map 300, in order to quickly and efficiently find the fastest path or the shortest path. It is known in the art to employ relaxation methods for performing path searching. When an adjacency matrix representation of a map shown on the right of FIG. 7 is adopted, since relationships between nodes are not definite, the range and possibility of path searching may not be effectively confined. Therefore, for each node, all possibility of paths between any pair of connected or disconnected nodes are considered every time when the relaxation operation is performed, and the computational efficiency of the navigation module 200 may be degraded.

Figure 8:
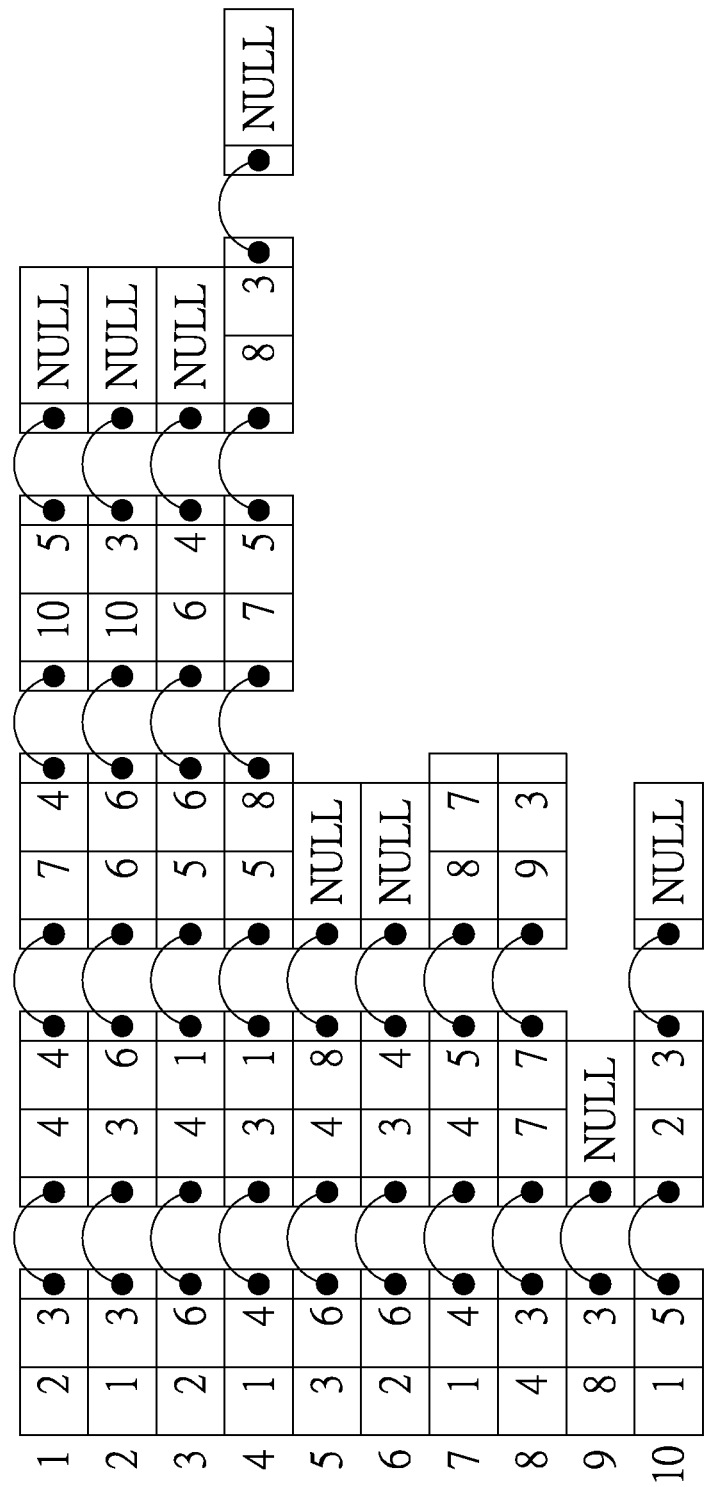
FIG. 8 is a schematic diagram illustrating an example of an adjacency list representation of a map, according to one embodiment of the disclosure.

To improve the computational efficiency of path searching, according to an embodiment of this disclosure, as shown in FIG. 8, an adjacency list representation of a map only including relationship and distance information between any pair of connected nodes is provided so as to establish definite node representation of a map.

As such, during the procedure of relaxation methods, relaxation is only performed on nodes that are connected, and therefore the computation time may be reduced. Moreover, since elements of an adjacency list are capable of storing distance information between any pair of connected nodes which is usable for shortest path searching, the adjacency list representation of a map shown in FIG. 8 can be further simplified to result in a dynamic adjacency list representation of a map shown in FIG. 9. The dynamic adjacency list representation of a map thus simplified is required to only record relationship information between any pair of connected nodes, numberings of other nodes that are connected thereto. In this way, the node representation of the map can be simplified to facilitate subsequent map data update.

In step S63, using the Dijkstra's algorithm, a shortest path tree is established. Specifically, the node representing the current position is identified to serve as a starting point, and the distance between any pair of connected nodes are searched and compared so as to determine a nearest node with respect to the node (i.e., the current position), and the nearest node is added to the shortest path tree.

Next, the nearest node thus determined is employed to serve as a starting point, and relaxation is performed on neighboring nodes that are not on the shortest path tree. The aforementioned steps are iterated until relaxing a node which represents the target position is added to the shortest path tree, at which time the path searching algorithm is finished. The path thus found serves as the path having the shortest distance between the current position and the target position.

Afterward, the navigation signal may be outputted by the navigation unit 200 in a manner of an image message or a text message. In one embodiment, the navigation signal may be outputted to a display interface (not shown in the drawings) in order to be displayed for view by the user.

To sum up, the method and the device as described in the disclosure provide a way to accurately determine how the user moves or does not move by using the proposed walk detection method for detecting the motion state of the user, in order to more efficiently obtain the displacement vector to be used by the navigation unit 200. In turn, the navigation unit 200 is capable of providing the user with route directions to the preset destination without any positioning infrastructure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for detecting a motion state of a user, the method to be implemented by a device including an inertial measurement unit (IMU) that is worn on the user, and a displacement processing unit coupled to the IMU, the method comprising the steps of:
   a) measuring a number of triaxial components of gravitational acceleration vector of the device worn the user from the IMU;
   b) calculating, by the displacement processing unit, a triaxial angular velocity of the device via the triaxial components of gravitational acceleration vector detected in step a) and kinematics;
   c) recording, by the displacement processing unit, a plurality of data inputs of the triaxial angular velocity, and recording the data inputs that are not larger than a preset filtered threshold as effective data inputs;
   d) calculating, by the displacement processing unit, a mean of the effective data inputs of the triaxial angular velocity recorded in step c);
   e) calculating, by the displacement processing unit, a difference value that is associated with a difference between the effective data inputs of the triaxial angular velocity and the mean, and comparing the difference value with a preset threshold of walking state; and
   f) determining, by the displacement processing unit, the motion state of the user, wherein when the difference value is smaller than the threshold of walking state, the user is determined to be in a walking state, and when the difference value is larger than the threshold of walking state, the user is determined to be in a shaking state at the same location;
   the method further comprising, after step f), the step of:
   g) generating, by the displacement processing unit, a displacement vector of the user in the three-dimensional coordinate system based on the motion state of the user determined in step f), a walking direction estimated by an e-compass, and a walking distance of the user;
   wherein, in step g), the walking distance of the user is obtained by:
      estimating, by the displacement processing unit, a step count and a leg swing angle of the user based on a uniform circular motion model of simple harmonic motion in terms of the gravitational-axial acceleration vector of the user in the walking state;
      estimating, by the displacement processing unit, a step length of the user according to the uniform circular motion model of simple harmonic motion, the leg swing angle, and a preset leg length of the user; and
      multiplying the step count thus estimated by the step length thus estimated.

2. The method of claim 1, further comprising, between steps c) and d), the steps of:
   comparing, by the displacement processing unit, the effective data inputs of triaxial angular velocity with a preset threshold of still state;
   wherein, when it is determined by the displacement processing unit that the effective data inputs of triaxial angular velocity are smaller than the threshold of still state, the displacement processing unit determines that the user is in a still state, and subsequently resets and re-records the effective data inputs of the triaxial angular velocity; and
   when it is determined by the displacement processing unit that the effective data inputs of triaxial angular velocity are larger than the threshold of still state, the flow proceeds to step d).

3. The method of claim 2, wherein the preset threshold of still state is 1 degree/millisecond.

4. The method of claim 1, wherein the preset filtered threshold is 5 degrees/millisecond, and the preset threshold of walking state is 30 degrees/millisecond.

5. The method of claim 1, the device further including a navigation unit, the navigation unit storing a map therein, the method, after step g), further comprising the steps of:
   mapping a current location of the user onto a corresponding coordinate set of the map, the current location being obtained based on the displacement vector of the user; and
   outputting a navigation signal that indicates route directions from the current location of the user to a preset destination.

6. The method of claim 5, wherein the navigation signal is generated by:
   creating a dynamic adjacency list representation of the map that includes a plurality of nodes, wherein the current location of the user and the preset destination are listed as two separate nodes; and
   finding a shortest path between the two separate nodes using the Dijkstra's algorithm.

7. The method of claim 5, wherein the navigation signal is outputted in a manner of an image message or a text message.

8. A device for detecting a motion state of a user, comprising an inertial measurement unit (IMU) that is worn on the user and a displacement processing unit coupled to said IMU, wherein, said IMU is configured to measure a number of triaxial components of gravitational acceleration vector of the device, and said displacement processing unit is programmed to:
   calculate a triaxial angular velocity of the device based on the triaxial components of gravitational acceleration vector detected by said IMU;
   record a plurality of data inputs of the triaxial angular velocity, and record the data inputs that are not larger than a preset filtered threshold as effective data inputs;
   calculate a mean of the effective data inputs of the triaxial angular velocity thus recorded;
   calculate a difference value that is associated with the effective data inputs of the triaxial angular velocity and the mean of the effective data inputs of the triaxial angular velocity; and
   determine the motion state of the user, wherein when the difference value is smaller than a preset threshold of walking state, the user is determined to be in a walking state, and when the difference value is larger than the threshold of walking state, the user is determined to be in a shaking state at the same location;
   wherein said displacement processing unit is further configured to obtain a displacement vector of the user in the three-dimensional coordinate system based on:
   the motion state of the user thus determined;
   a walking direction estimated by an e-compass; and
   a walking distance of the user;
   wherein said displacement processing unit obtains the walking distance of the user by:
      estimating a step count and a leg swing angle of the user based on a uniform circular motion model of simple harmonic motion, in terms of the gravitational-axial acceleration vector of the user in the walking state;

estimating a step length of the user according to the uniform circular motion model of simple harmonic motion, the leg swing angle, and a preset leg length of the user; and multiplying the step count thus estimated and the step length thus estimated.

9. The device of claim 8, further comprising a navigation unit that stores a map therein, and that is programmed to:

map a current location of the user onto a corresponding coordinate set of the map, the current location being obtained based on the displacement vector of the user; and output a navigation signal that indicates route directions from the current location of the user to a preset destination.

10. The device of claim 9, wherein said navigation unit is programmed to generate the navigation signal by:

creating a dynamic adjacency list representation of the map that includes a plurality of nodes, wherein the current location of the user and the preset destination are listed as two separate nodes; and finding a shortest path between the two separate nodes using the Dijkstra's algorithm.

11. The device of claim 9, wherein said navigation unit is programmed to output the navigation signal in a manner of an image message or a text message.

\* \* \* \* \*